(12) United States Patent
Cui et al.

(10) Patent No.: US 12,097,993 B2
(45) Date of Patent: Sep. 24, 2024

(54) HIGH-STRENGTH FOAM BEARING PALLET

(71) Applicants: Yingxiang Cui, Hubei (CN); Guofeng Xie, Huizhou (CN)

(72) Inventors: Yingxiang Cui, Hubei (CN); Guofeng Xie, Huizhou (CN)

(73) Assignees: Jingmen I-Chain Technology Co., Ltd., Hubei (CN); Huizhou Jiasheng Packaging Co., Ltd., Huizhou (CN)

( * ) Notice: Subject to any disclaimer, the term of this patent is extended or adjusted under 35 U.S.C. 154(b) by 182 days.

(21) Appl. No.: 17/821,792

(22) Filed: Aug. 23, 2022

(65) Prior Publication Data

US 2024/0067395 A1 Feb. 29, 2024

(51) Int. Cl.
*B65D 19/00* (2006.01)
*B32B 5/18* (2006.01)
*B32B 27/06* (2006.01)
*B32B 27/36* (2006.01)

(52) U.S. Cl.
CPC ............ *B65D 19/0026* (2013.01); *B32B 5/18* (2013.01); *B32B 27/065* (2013.01); *B32B 27/36* (2013.01); *B32B 2266/0228* (2013.01); *B32B 2307/21* (2013.01); *B32B 2307/3065* (2013.01); *B32B 2307/422* (2013.01); *B32B 2307/744* (2013.01); *B65D 2519/00034* (2013.01); *B65D 2519/00044* (2013.01); *B65D 2519/00069* (2013.01); *B65D 2519/00079* (2013.01); *B65D 2519/00273* (2013.01); *B65D 2519/00288* (2013.01); *B65D 2519/00333* (2013.01); *B65D 2519/00407* (2013.01); *B65D 2519/00412* (2013.01); *B65D 2519/00835* (2013.01); *B65D 2519/0086* (2013.01)

(58) Field of Classification Search
CPC ...... B65D 19/0006; B65D 2519/00069; B32B 5/18; B32B 27/065; B32B 27/36; B32B 2266/0228; B32B 2307/21; B32B 2307/3065; B32B 2307/422; B32B 2307/744
See application file for complete search history.

(56) References Cited

U.S. PATENT DOCUMENTS

| | | | | |
|---|---|---|---|---|
| 5,830,548 | A * | 11/1998 | Andersen | C04B 28/04 428/152 |
| 9,656,781 | B1 * | 5/2017 | Johnson | B65D 19/0028 |
| 11,220,205 | B2 * | 1/2022 | Bullock | B60P 7/14 |
| 2012/0079966 | A1 * | 4/2012 | Huang | B32B 27/36 156/267 |

(Continued)

*Primary Examiner* — Daniel J Rohrhoff

(57) ABSTRACT

A high-strength foam bearing pallet is disclosed. The foam bearing pallet comprises a foam bearing plate and supporting legs configured on the lower end of the foam bearing plate. The foam bearing plate comprises a foam core and a PET reinforcing film covering the outer surface of the foam core to increase its strength. The PET reinforcing film is made of a PET sheet heated and fixed to the outer surface of the foam core through vacuum forming. The PET reinforcing film limits and tightens the foam core to prevent the foam core from deformation or fracture. As the outer surface of the foam core is wholly covered by the reinforcing film, and the reinforcing film limits and tightens the foam core, the foam bearing pallet will have higher strength.

8 Claims, 2 Drawing Sheets

(56) References Cited

U.S. PATENT DOCUMENTS

| | | | |
|---|---|---|---|
| 2013/0133557 A1* | 5/2013 | Yoshinaga | B65D 19/0018 |
| | | | 108/57.25 |
| 2013/0145971 A1* | 6/2013 | Federl | B65D 19/38 |
| | | | 108/57.25 |
| 2018/0072457 A1* | 3/2018 | Liang | C08G 18/1833 |
| 2020/0039685 A1* | 2/2020 | Weeks | B65D 19/0012 |

* cited by examiner

HIGH-STRENGTH FOAM BEARING PALLET

BACKGROUND OF INVENTION

1. Field of the Invention

The invention relates to the technical field of pallet products, and more particularly to a high-strength foam bearing pallet.

2. Description of Related Art

Pallets are widely used for container shipping, stacking, carrying, and transportation, for horizontal placement of goods and products. Like containers, pallets are an important tool used in the logistics industry for loading and unloading, storage and transportation. It provides great convenience for storage and transfer. With the use of forklifts, pallets substantially enhance loading and unloading efficiency, reduces labor as well as product damage in the process of manual handling. Therefore, pallets are widely used in production, transportation, storage, distribution, and other fields. The pallet is one of the key innovations in the logistics industry in the 20th century. It has brought a lot of benefits to the modern logistics industry, including standardized packaging, protected goods, convenient transportation and distribution.

At present, foam bearing pallets can only bear limited loads. When overloaded, the pallet may easily break. Therefore, the service life of foam bearing pallets is short.

In view of this, the present invention provides the following technical solution.

SUMMARY OF THE INVENTION

The purpose of the present invention is to overcome the deficiencies of the existing technology and provide a high strength foam load tray.

A high-strength foam bearing pallet, comprising a foam bearing pallet and supporting legs disposed at a lower end of the foam bearing pallet, characterized in that:

the foam bearing plate includes a foam core and a PET reinforcing film attached to the outer surface of the foam core to increase the strength, the PET reinforcing film is made of a PET sheet heated and fixed to the outer surface of the foam core through vacuum forming, the PET reinforcing film limits and tightens the foam core to prevent the foam core from deformation and breakage, the supporting legs have the same structure as the foam bearing plate.

More particularly, wherein the outer surface of the PET reinforcing film is also provided with an antistatic layer, the antistatic layer is evenly distributed with antistatic particles.

More particularly, wherein the outer surface of the antistatic layer is also provided with a worm prevention layer, the worm prevention layer is evenly distributed with worm prevention particles, the worm prevention particles being sulfluramid particles, and the particle size being 0.1-100 nm.

More particularly, wherein the outer surface of the worm prevention layer is provided with an anti-aging layer, the anti-aging layer is evenly distributed with anti-aging particles.

More particularly, wherein the outer layer of the anti-aging layer is provided with a fire protection layer, the fire protection layer is an aluminum oxide layer, a PVC layer, an epoxy layer, a chlorine paraffin layer, or an aluminum borate layer.

More particularly, wherein the outer surface of the fire protection layer is provided with a fluorescent layer, and the fluorescent layer is evenly distributed with fluorescent particles.

More particularly, wherein the lower ends of the supporting legs are provided with a non-slip layer.

More particularly, wherein the outer surface of the non-slip layer is formed with a non-slip pattern.

More particularly, wherein the foam bearing pallet and the supporting legs are two independent members, forming a detachable assembly structure.

More particularly, wherein the foam bearing plate and the supporting legs are integral structure, the supporting legs are integrally connected to the lower end of the foam bearing plate; the PET reinforcing film covers both the foam bearing plate and the supporting legs as a whole.

Comparing to the prior art, the technology of the present invention can provide the following benefits:

1. The foam bearing pallet of the present invention adopts a reinforcing film to cover the surface of the foam core. The reinforcing film tightens the foam core and increases the strength of the foam bearing pallet, preventing it from deformation or fracture of the foam core. Because the structure the supporting legs is the same as that of the foam bearing plate, the strength of the supporting legs is also increased and will not deform or break. When receiving an external force, the legs will not collapse or break on the edge. Therefore, the overall service life of the pallet can be extended.
2. The present invention has good performance in fire resistance. As it is non-flammable, it can eliminate potential safety risks. Also, the pallet has good antistatic performance, and will not generate static charges. Therefore, it can be used to transport products that are vulnerable to static electricity, leading to wider application scope of the pallet. The pallet also has good anti-aging performance. As it does not age easily, the pallet will have a long service life. Moreover, the pallet has good performance in insect resistance. During warehousing, it will not be damaged by worms and will be maintained in a good state. Other advantages include light weight, low cost, good thermal insulation, shock resistance, good corrosion resistance, easy cleaning, recycling, protection of the environment, and reduction of transportation cost. The pallet does not contain sharp nails or burrs, and will not cause injury of the human body or scratch of the goods. It has a high reliability.

DETAILED DESCRIPTION OF THE INVENTION

Figure 1:
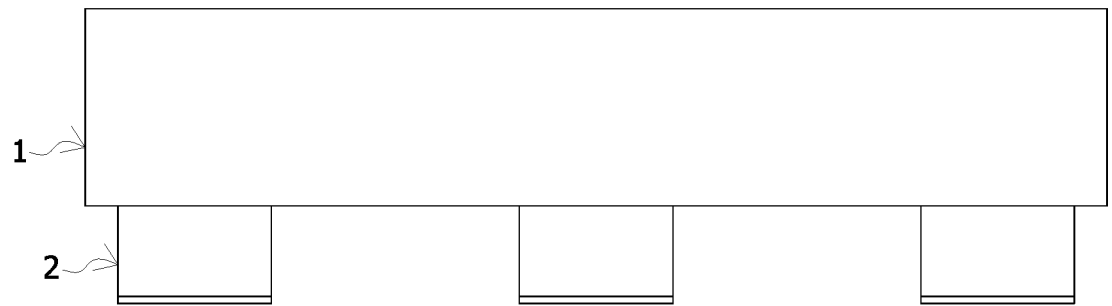
FIG. 1 is a master view of the present invention.
Figure 2:
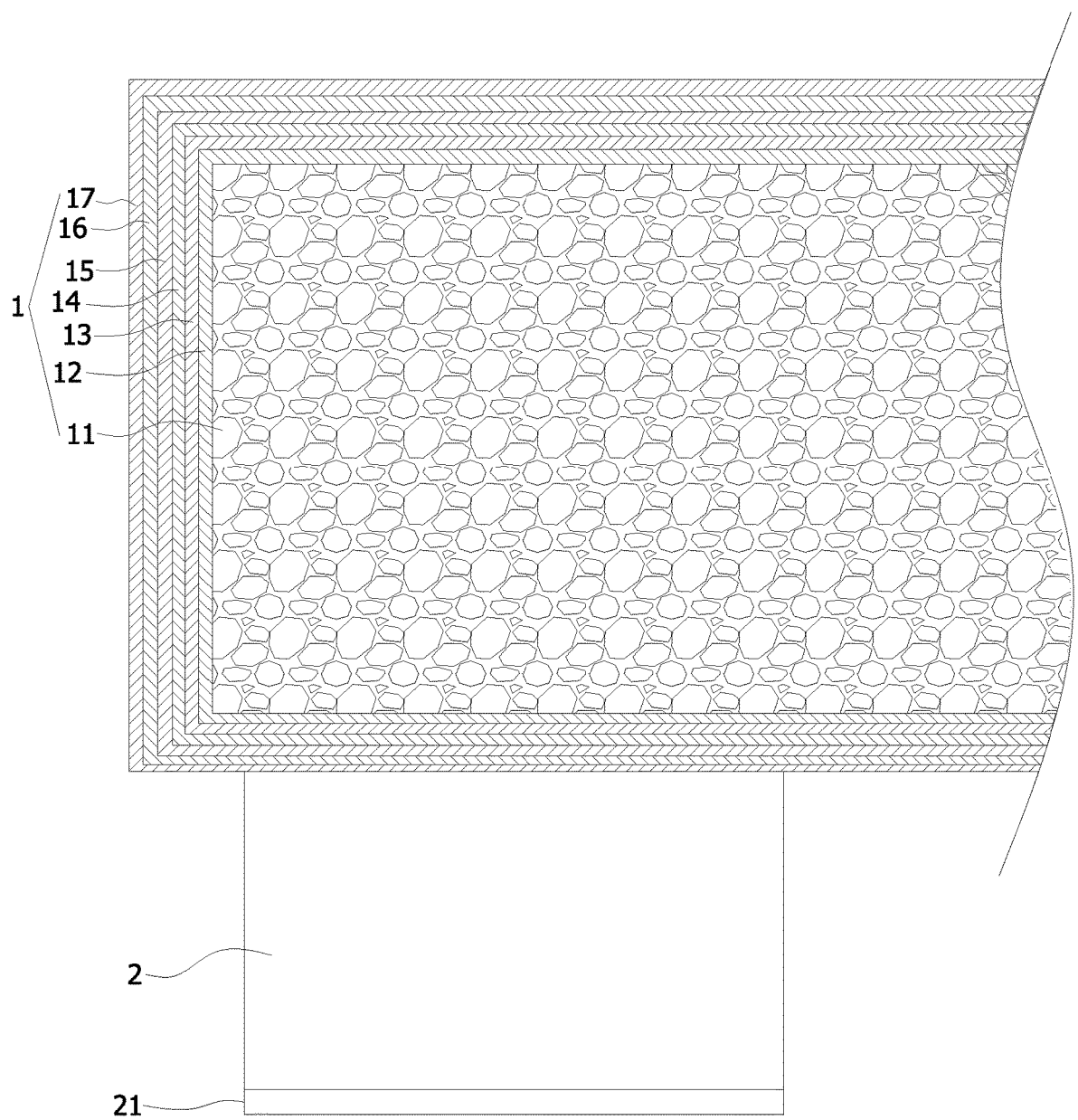
FIG. 2 is a sectional view of the present invention.

Depicted in FIGS. 1-2 is a high-strength foam bearing pallet, which comprises a foam bearing plate 1 and supporting legs 2 configured at the lower end. The foam bearing plate 1 is used for supporting the cargo. The supporting legs 2 stand on the ground and support the foam bearing plate 1. Gaps are formed between the supporting legs 2 for insertion of the forks of a forklift truck.

The corners of the foam bearing pallet 1 are rounded. The structural design is simple and can be formed easily. The corners will not cause injury to the human body. The whole product is safe in operation, nice in shape, and practical in usage.

The foam bearing plate 1 includes a foam core 11 and a PET reinforcing film 12 covering and attached to the outer surface of the foam core 11 to increase the strength. The PET reinforcing film 12 is made of PET sheet and is covered on and attached to the outer surface of the foam core 11 through plastic forming. The PET reinforcing film 12 limits and tightens the foam core 11 to prevent it from deformation or breaking. The structure of the supporting legs 2 is the same as that of the foam bearing support plate 1. The foam bearing pallet 1 of the present invention adopts a reinforcing film 2 that covers the surface of the foam core 11. The foam core 11 is limited and tightened by the reinforcing film 2, thus increasing the strength of the foam bearing pallet. Since the structure of the supporting legs 2 is the same as that of the foam bearing pallet 1, the supporting legs 2 are strengthened and will not deform or break. When subject to a load, the supporting legs 2 will not break to cause collapse of the goods or breakage of the foam bearing pallet 1. Therefore, the overall service life of the pallet can be extended.

The foam core 11 is made of EPS material. EPS is expanded polystyrene, featuring light weight, shock resistance, shatter resistance, heat insulation, sound absorption, heat insulation, self-extinguishing, environmental protection and age resistance, low cost, easy construction and more. It is widely used in the construction and packaging industries.

PET is polyethylene terephthalate. Its chemical formula is —OCH2—CH2OCOC6H4CO—. Its full English name is polyethylene terephthalate, but is usually referred to as PET. It is a superpolymer made from ethylene terephthalate through dehydration and condensation reaction. Ethylene terephthalate is obtained from the esterification reaction of terephthalic acid and ethylene glycol. PET is milky white or light yellow, and is a highly crystalline polymer with a smooth and glossy surface. It has excellent physical and mechanical properties in a wide temperature range. Its working temperature can reach 120° C. It has an excellent electrical insulation property. In high temperature and high frequency, its electrical property is still good, but its corona resistant property is poor. It has very good creep resistance, fatigue resistance, friction resistance and size stability.

The outer surface of the PET reinforcing film 13 is configured with an antistatic layer 12, within which antistatic particles are evenly distributed. The particles are monoglyceride particles, with a particle size of 0.1-100 nm. The nano-grade anti-static particles are much better in anti-static performance than the ordinary-sized anti-static particles, allowing the pallet to be used for transportation of some products that are susceptible to static electricity, and thus increasing the application range of the pallet. This provides great convenience. The scientific name of GMS is Glycerin monostearate. It has a molecular weight of 358. Its industrial products are usually slightly yellow wax-like solid or flakes, tasteless, odorless, and non-toxic. Glycerin monostearate is easily emulsified with water, forming an oil-wrapped water type emulsifier. However, because it has a strong emulsifying performance, it can be used as a water-wrapped oil type emulsifier. Glycerin monostearate is mainly used in the plastic industry as a mold release agent, plasticizer, or antistatic agent, and it is especially good as the shrinkage agent for plastic foam products. Glycerin monostearate is an indispensable lubricant in compound lead salt stabilizers. Glycerin monostearate is an oil-soluble nonionic surfactant with an HLB value of 3.6-4.0, and is widely used as emulsifier, dispersant, emulsion stabilizer and thickening agent for flavors and fragrances as well as food. It is also an effective defoaming agent for the processing of soy products. As a textile printing and dyeing aid, it is the best anti-discoloration and softening agent for fabrics. In the production of PVC products, it is often used as an internal lubricant.

The outer surface of the antistatic layer 13 is also provided with a worm prevention layer 14, in which worm prevention particles are evenly distributed. The worm prevention particles are sulfluramid particles with size of 0.1-100 nm. As the sources of sulfluramid particle material are extensive, the cost of the material is low. With a good worm prevention property, the material can prevent the pallet from damage by worms and is highly reliable. The nano-grade worm prevention particles have better worm prevention performance comparing to the ordinary-sized worm prevention particles, and can effectively prevent the pallet from damage by worms, thus extending the service life of the pallet.

The outer surface of the worm prevention layer 14 is also provided with an anti-aging layer 15, which is evenly distributed with anti-aging particles, being antioxidant 1076 particles, antioxidant 164 particles or antioxidant MB particles. The size of the anti-aging particles is 0.1-100 nm. With the configuration of the anti-aging layer 15, the pallet has better resistance to aging and has a longer service life.

In the present embodiment, the anti-aging particles adopted are antioxidant 1076 particles. Antioxidant 1076 is a white or slightly yellow crystalline powder with a melting point of 50 to 55° C., nontoxic, insoluble in water, soluble in solvents such as benzene, acetone, ethane and esters, and it can serve as an antioxidant for resins such as polyethylene, polypropylene, polystyrene, polyvinyl chloride, polyamide, ABS and acrylic acid. Antioxidant 1076 has good oxygen resistance, low volatility and good durability to washing. In applications, the amount of antioxidant 1076 used is usually less than 0.5%. It can be used as a forming aid for food packaging materials. The adoption of antioxidant 1076 can help improve the anti-aging performance of the pallet, and extend the service life of the pallet. Its nano-grade anti-aging particles offer better anti-aging property than the ordinary-sized anti-aging particles, and will contribute to better anti-aging effect and longer service life.

The outer surface of the anti-aging layer 15 is also provided with a fire protection layer 16. The fire protection layer 16 is any one of aluminum oxide layer, PVC layer, epoxy resin layer, chlorine paraffin layer, or aluminum borate layer. In this embodiment, the fire protection layer 16 adopted is aluminum oxide layer, which has good fire prevention performance. It has good resistance to fire, non-flammable, and high safety.

The outer surface of the fireproof layer 16 is also provided with the fluorescent layer 17, which is evenly distributed with fluorescent particles. Through the configuration of the fluorescent layer 17, the present invention can emit fluorescence when the light is insufficient, enabling the operator to see the pallet during the operation. This provides an additional practical convenience.

The lower end of the supporting leg 2 is provided with a non-slip layer 21. This non-slip layer 21 is in contact with the ground to enhance the friction force so that the pallet can stand on the ground more stably.

Moreover, the outer surface of the non-slip layer 21 is formed with a non-slip pattern, which can help increase the friction against the ground.

The foam bearing plate 1 and the supporting legs 2 are combined at least in the following two structural forms:

Type 1: The foam bearing plate 1 and the supporting legs 2 are an integral structure. The supporting legs 2 are integrally connected to the lower end of the foam bearing plate 1. The PET reinforcing film 12 covers the foam bearing plate 1 and the supporting legs 2 as a whole. Since the foam bearing plate 1 and the supporting legs 2 are an integral part, the structure is more stable. The entire coverage of the PET reinforcing film 12 around the foam bearing plate 1 and the supporting legs 2 can greatly increase the overall strength of the pallet and improve the bearing capacity.

Type 2: The foam bearing plate 1 and the supporting legs 2 are two independent members, and can be assembled or disassembled. The supporting legs 2 have the same structure as the foam bearing plate 1. Because the foam bearing plate 1 and the supporting legs 2 are assembled together, when one supporting leg 2 is damaged, the damaged supporting legs 2 can be removed, and a new supporting leg can be installed to extend the service life of the product. Even when the pallet is abandoned, the supporting legs 2 can be disassembled and recycled for environmental protection and cost reduction.

In the present embodiment, the supporting legs 2 are distributed in three groups, respectively on the two lateral sides and the middle of the bottom end of the foam bearing plate 1. Each group of the supporting legs 2 comprises at least three supporting legs 2.

In conclusion, in the foam bearing plate 1 of the present invention, a reinforcing film 2 is adopted to cover the surface of the foam core 11. The reinforcing film 2 limits and tightens the foam core 11, thus increasing the strength of the foam bearing pallet 1 and preventing the foam core 11 from deformation or breaking. Since the structure of the supporting legs 2 is the same as that of the foam bearing pallet 1, the supporting legs 2 are much stronger and will not deform or break to cause collapse of goods or breakage of the foam bearing pallet 1 when subject to an external force. Therefore, the overall service life of the pallet can be much longer.

We claim:

1. A high-strength foam bearing pallet, comprising a foam bearing pallet (1) and supporting legs (2) disposed at a lower end of the foam bearing pallet (1), wherein the foam bearing pallet (1) includes a foam core (11) and a PET reinforcing film (12) attached to an outer surface of the foam core (11) to increase the strength, the PET reinforcing film (12) is made of a PET sheet heated and fixed to the outer surface of the foam core (11) through vacuum forming, the PET reinforcing film (12) limits and tightens the foam core (11) to prevent the foam core (11) from deformation and breakage, the supporting legs (2) have the same structure as the foam bearing pallet (1);

wherein an outer surface of the PET reinforcing film (12) is also provided with an antistatic layer (13), the antistatic layer (13) is evenly distributed with antistatic particles;

wherein the outer surface of the antistatic layer (13) is also provided with a worm prevention layer (14), the worm prevention layer (14) is evenly distributed with worm prevention particles, the worm prevention particles being sulfluramid particles, and the particle size being 0.1-100 nm.

2. The high-strength foam bearing pallet defined in claim 1, wherein the outer surface of the worm prevention layer (14) is provided with an anti-aging layer (15), the anti-aging layer (15) is evenly distributed with anti-aging particles.

3. The high-strength foam bearing pallet defined in claim 2, wherein the outer layer of the anti-aging layer (15) is provided with a fire protection layer (16), the fire protection layer (16) is an aluminum oxide layer, a PVC layer, an epoxy layer, a chlorine paraffin layer, or an aluminum borate layer.

4. The high-strength foam bearing pallet defined in claim 3, wherein the outer surface of the fire protection layer (16) is provided with a fluorescent layer (17), and the fluorescent layer (17) is evenly distributed with fluorescent particles.

5. The high-strength foam bearing pallet defined in claim 4, wherein the lower ends of the supporting legs (2) are provided with a non-slip layer (21).

6. The high-strength foam bearing pallet defined in claim 5, wherein the outer surface of the non-slip layer (21) is formed with a non-slip pattern.

7. The high-strength foam bearing pallet defined in claim 1, wherein the foam bearing pallet (1) and the supporting legs (2) are two independent members, forming a detachable assembly structure.

8. The high-strength foam bearing pallet defined in claim 1, wherein the foam bearing pallet (1) and the supporting legs (2) are integral structure, the supporting legs (2) are integrally connected to the lower end of the foam bearing pallet (1); the PET reinforcing film (12) covers both the foam bearing pallet (1) and the supporting legs (2) as a whole.

* * * * *